Nov. 6, 1962 J. E. CLARKE 3,061,887
METHOD OF MAKING RAM BEARING
Filed July 13, 1959
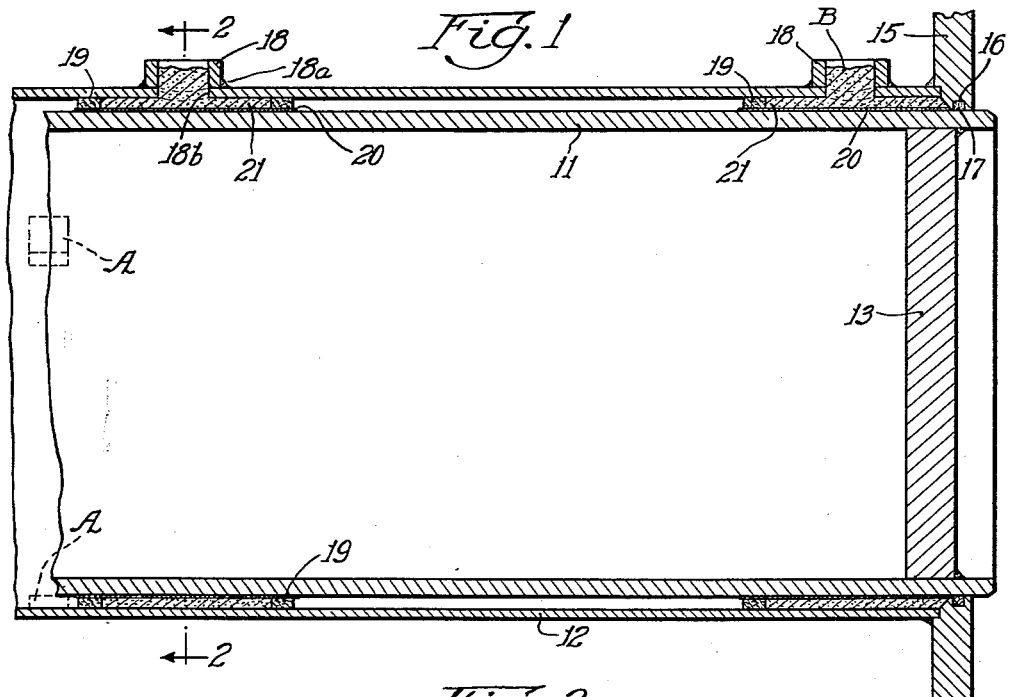
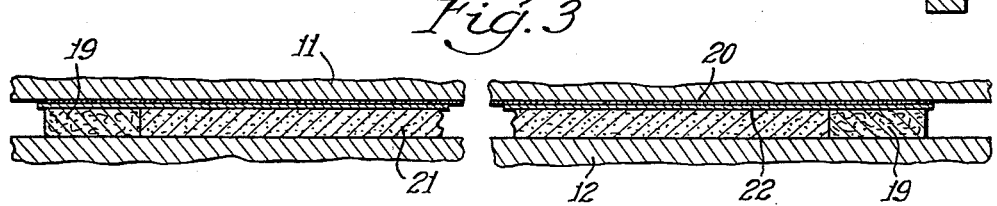
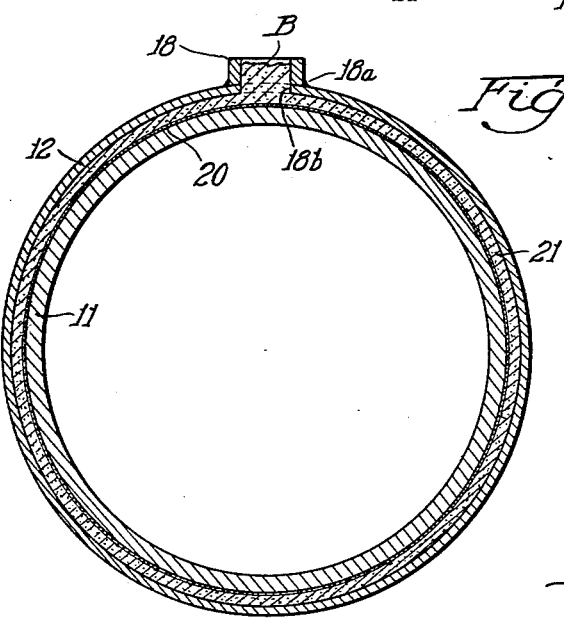
Inventor:
Jesse E. Clarke
By: Jones, Darbo + Robertson
Attys.

United States Patent Office 3,061,887
Patented Nov. 6, 1962

3,061,887
METHOD OF MAKING RAM BEARING
Jesse E. Clarke, Hinsdale, Ill., assignor to Autoquip Corporation, Chicago, Ill., a corporation of Illinois
Filed July 13, 1959, Ser. No. 826,871
9 Claims. (Cl. 18—59)

This invention relates to method of making ram bearings particular. The invention has particularly utility for assembling automobile lift devices for use in garages, filling stations, repair shops and other such locations.

Heretofore guide surfaces for running or moving parts such as relatively large pistons in corresponding cylinders have involved employment of bronze or babbitt metal rings, for example, which must be cast and machined, and then fitted to the piston or plunger to guide it in its movements in the cylinder or casing, such rings being commonly welded, screwed or bolted to the inside of the cylinder or to the inner end of the ram and then subsequently machined to size. Since production economies require that all elements in a given nominal fit size be uniform in dimensions, the bearing rings are necessarily finished to a standard dimension tolerance to which also the mating pistons and cylinders are also finished. An approximate size is generally chosen which affords the greatest economy in raw material selectivity such as stock removal to achieve optimum rectilinearity, annularity and finish. This compromise requires that more stock be removed from much of the material than would be necessary if less close tolerances were feasible. It also requires pre-selection procedures to check materials before turning or machining and requires that certain materials be rejected if rough size or shape would not permit finishing to the standard tolerance.

The present method makes these prior practices unnecessary, thereby effecting marked economies in material and labor as well as expediting production and assembly of rams and the like, with improved results in the fit of the piston in the cylinder and the subsequent operation thereof. According to the present process, the finished piston is positioned in its cylinder and centered therein. A protective or clearance material or film is first applied to the piston, which material is later releasable, for example by heating. Then, a low cost liquid or plastic bearing material is poured between the piston and the cylinder, such material, on setting, bonding to the cylinder, but, because of the releasable film, not to the ram. There is thus formed an extremely precise bearing which is ready for use without subsequent processing and which is dimensionally accurate beyond the practical limits of machined bearings. The clearance material provides running clearance and compensation for variations in thermal behavior between the piston and cylinder after the bearing material has set.

Where special anti-friction properties are desired for the bearing, a layer of lubricous or highly anti-friction material may be applied around the piston over the clearance material and allowed to bond to the bearing material, thus providing a permanent and specially efficient anti-friction liner. If physical strength of a high order is required for the liner, metallic cloth or mesh, or fiberglas, may be incorporated in the liner material.

Basic materials for the poured bearing are desirably selected to combine great bonding strength with chemical and thermal stability suitable to the application. High yield strength, low plastic deformation, and low friction coefficient, are also important properties for the bearing material. A room temperature thermosetting resin is desirable.

A suitable bearing material for general use in hydraulic rams has been found to be as follows:

100 parts by weight of thermosetting liquid epoxy resin, for example, Ciba Araldite 6005,
14 parts by weight of epoxy curing agent, for example, Ciba Araldite 951,
13 parts by weight of epoxy plasticizer, for example, Thiokol L-P-3,
100 parts by weight of fine iron powder (micro size),
30 parts by weight of fine graphite flakes,
30 parts by weight of molybdenum-disulphide powder (micro size).

The iron powder enhances the compression strength. The graphite flakes contribute lubricity. The molybdenum disulphide powder contributes lubricity and also anti-slipstick properties. The thermosetting resin provides a bonding agent. Other plastics may be suitable such as polyesters and polyvinyls, or even resins requiring a curing oven where feasible.

The illustrative mix has been found to cure or set in from fourteen to twenty hours at 72 degrees F. and to reach maximum physical strength in from ten to twenty days, depending upon the section, size and environment. The compressive strength of this material is more than double that of babbitt metal, and its wearing qualities under high bearing loads and abrasive laden fluids is far superior to that of most metals. Its static friction coefficient against steel is a little higher than bronze but its running friction is much lower. Its chemical and thermal stability is excellent. Shrinkage during cure is advantageously negligible.

The present novel method is described more in detail by reference to the accompanying drawings, showing an illustrative practice thereof, and in which:

FIGURE 1 is a fragmentary axial sectional view of a cylinder and a piston telescoped therein, showing a bearing provided by the present method;

FIGURE 2 is a cross-section taken on the line 2—2 of FIG. 1; and

FIGURE 3 is a view similar to FIG. 1, but still more fragmentary and enlarged, showing a modification of the process of FIG. 1.

Referring in detail to the illustrative structure and method depiction shown in the drawings, numeral 11 represents a plunger or piston conveniently formed in this instance of a section of seamless steel or iron pipe. 12 is a casing, tube or cylinder therefor also conveniently formed of similar material. The cylinder and telescopsed piston may be parts for a hydraulic ram such as an automobile service station lift device. Because of the load to be sustained by the piston 11 when it is elevated, the wall section of the latter is desirably somewhat greater than that of the cylinder. At its upper end the ram is shown carrying a center plate 13, within its inside diameter. The other end of the piston (not shown) may carry a similar plate. It will be understood that the cylinder and piston are vertically disposed in normal use but are aligned horizontally as shown in the drawing, for purposes of assembly, following the present method.

Piston 11 may be centered in cylinder 12 by any suitable means such as, at one end, cap ring 15 on the cylinder, and, at the other end, shims A, arranged 120 degrees apart. Cap ring 15 may have a seal receiving groove 16 into which any suitable sealing material 17 may be inserted.

On the upper side of the cylinder 12, in its horizontal position as shown, is provided a pair of pouring gates 18. Pouring gates 18 may be pipe sections welded as at 18a around apertures 18b in the cylinder. The arrangement at the lefthand end of the drawing (FIG. 1) will first be described.

On each side axially of the pouring gate 18 and for encircling the piston 11 is interposed an annular strip 19 of yieldable or compressible material 19 such as felt. Before the piston is put into the cylinder, the felt strips 19 are located in the latter by any suitable jig or applicator. These felt strips or bands 19 enclose an axially restricted annular space in the region of the pouring gate 18 and act as dams for the pouring of the bearing material therebetween. The felt strips also serve as means assisting to center the piston in the cylinder radially, and, furthermore, serve later as wipers to keep foreign material out of the bearing. The felt strips may carry a pressure sensitive adhesive on their faces contiguous to the cylinder to cause them to adhere thereto.

Before the piston is inserted in the cylinder it is coated with a wax film 20 in the region between the dams 19, to serve as a later releasable protective or clearance layer thereon. In large rams, instead of a rubbed-on coating of wax, a single wrap of .0045 inch thick brown paper held in place by cellophane tape, may be used.

The axial length of the layer or film 20 is not critical so long as it underlies the bearing material 21. Conveniently it also extends between the felt strips and the piston.

The bearing material indicated by the numeral 21, and having the epoxy resin and iron powder constituents, as previously described, is next poured in an initially fluid (liquid or plastic) state through the gate 18 and finds its way completely around the piston 11, between the latter and the cylinder 12, and between the dams 19, and over the wax film 20. It may run up into the gate as at B.

At the right-hand end in the drawing (FIG. 1) it will be apparent that only one of the felt band dams 19 is required in the region of the second pouring gate 18, since the cap ring 15 with its sealing material 17 provides a dam on the other side of the gate at this end.

The bearing material 21 bonds itself to the cylinder 12 but is kept from bonding to the piston 11 by reason of the film of wax 20 or other clearance material, which, as shown in FIG. 3, is placed around the piston 11 in the region where the bearing material 21 is to be poured. Wax film 20 is subsequently released so as to leave a free running surface on the ram. The wax may be dissolved by direct heating of the piston to approximately 140 F., or by radiant heat. In the case of a paper clearance material, a hot water pour may be employed.

It will be understood that the temporary shims A are removed after pouring and setting of the bearing.

Numeral 22 (FIG. 3) indicates an intermediate band, employed between the bearing material 21 and the wax film 20, and adhered to the bearing material, of material sold under the trademark "Teflon" tape or "T.F.E." film, or a woven graphite fabric, these being representatives of materials that have a greater affinity for the resin 21 than for the wax 20. They provide a running surface for the bearing in contact with the running surface of the piston having an extremely low coefficient of friction. Material 22 may be applied by wrapping, spraying or brushing on the cylinder over the wax film before the piston is inserted in the cylinder. It will then bond to the bearing material 21 when the latter is poured. Bronze fiber cloth or glass fiber cloth may be wrapped over the "Teflon" if desired for extra strength.

As here described, the process permits extremely small final dimensional tolerances and precision of fit superior by far to anything obtainable within the practical limits of machine operations, while effecting a substantially lower cost of manufacture than for comparable results with machined or hot cast methods.

The terms "cylinder" and "piston" are to be understood to include generally a housing and a running member respectively, and the term "ram" any such combination having axially relatively movable parts.

The cap ring or seal gland 15 and seal ring 17, in combination with the ram assembly are the subject of a separate patent application Serial No. 834,713, filed August 19, 1959, now Patent No. 3,007,723, dated November 7, 1961.

The invention having been described, what is here claimed is:

1. The method of making a ram for an automobile lift device embodying a cylinder and a piston, characterized by the steps of: disposing the cylinder horizontally, providing the cylinder with a pouring gate on its upper side, inserting annular dams axially spaced apart in said cylinder on opposite sides of the pouring gate, providing the piston with a clearance layer between said dams, telescopically centering the piston in the cylinder, and pouring an initially fluid, substantially dimensionally stable, thermosetting plastic material through said gate to bond annularly to said cylinder between said dams.

2. The method of claim 1 wherein a layer of highly non-friction material is interposed around said piston between the clearance layer and said plastic material, said non-friction material having a greater affinity for the plastic material than for the clearance material.

3. The method of claim 2 wherein said highly non-friction material includes a metallic textile substance.

4. The method of claim 1 wherein the plastic material is an epoxy resin.

5. The method of claim 4 wherein the plastic material includes iron powder in approximately equal proportion to the resin.

6. The method of claim 4 wherein the plastic includes fine graphite flakes.

7. The method of claim 1 wherein heat is applied to remove the clearance material.

8. The method of forming bearings in a cylindrical housing for a piston to be movable axially in said housing, said method comprising the steps of: securing a cap ring having a passage for said piston to one end of said housing; providing the housing with two openings in the wall thereof spaced axially from each other along the length of the housing with one opening being adjacent said one end; positioning the housing with its cylindrical axis substantially horizontal and with said openings upwardly; covering said piston with a clearance material in two cylindrical areas each extending in an axial direction a distance greater than the desired axial length of the finished bearings; inserting the piston into the housing and passage with said two areas being in juxtaposition to said openings respectively; centering said piston in said housing and defining the bearing lengths including inserting an annular dam between said clearance material and said housing adjacent said one opening and at the opposite side thereof from said one end, and inserting a pair of annular dams between the clearance material and housing at opposite sides of the other opening; pouring a liquid bearing forming material into said two openings to fill the spaces between the parting material and housing up to said openings, said material comprising approximately:

100 parts by weight of thermosetting liquid epoxy resin,
14 parts by weight of epoxy curing agent,
13 parts by weight of epoxy plasticizer,
100 parts by weight of fine metallic powder,
30 parts by weight of fine graphite flakes,
30 parts by weight of fine molybdenum disulphide powder;
curing said resin; and removing said clearance material.

9. The method of forming bearings in a cylindrical housing for a piston to be movable axially in said housing, said method comprising the steps of: providing the housing with two openings in the wall thereof spaced axially from each other along the length of the housing; positioning said housing with its cylindrical axis substantially horizontal and with said openings at the top thereof; covering two cylindrical areas of said piston with a clearance material, each of said areas extending in an axial direction a distance greater than the desired axial length of the bearings; inserting the piston into the housing and positioning the two areas in juxtaposition to said openings respectively; centering the cylindrical axis of said piston with the cylindrical axis of said housing; damming the space between the parting material and the housing at both sides of each of said openings; filling said dammed spaces up to said openings with a substantially dimensionally stable, thermoplastic, liquid, epoxy resin with a curing agent and plasticizer and solid lubricating material incorporated therein; curing said resin; and removing said clearance material.

References Cited in the file of this patent

UNITED STATES PATENTS

| | | |
|---|---|---|
| 415,694 | Bastian | Nov. 26, 1889 |
| 1,175,288 | Patrick | Mar. 14, 1916 |
| 1,500,815 | Hinman | July 8, 1924 |
| 1,599,924 | Sanborn | Sept. 14, 1926 |
| 1,881,601 | Hufferd et al. | Oct. 11, 1932 |
| 1,964,202 | Hooper | June 26, 1934 |
| 1,982,932 | Scribner | Dec. 4, 1934 |
| 2,007,308 | Sambrous | July 9, 1935 |
| 2,313,074 | Jewell | Mar. 9, 1943 |
| 2,397,626 | Shriver | Apr. 2, 1946 |
| 2,537,629 | Brown | Jan. 9, 1951 |
| 2,695,425 | Stott | Nov. 30, 1954 |
| 2,759,254 | Soehnlen | Aug. 21, 1956 |
| 2,763,047 | Laster | Sept. 18, 1956 |
| 2,795,523 | Cobb | June 11, 1957 |
| 2,954,992 | Baker | Oct. 4, 1960 |
| 2,961,704 | White | Nov. 29, 1960 |

FOREIGN PATENTS

| | | |
|---|---|---|
| 840,686 | Great Britain | July 6, 1960 |